Figure 1:
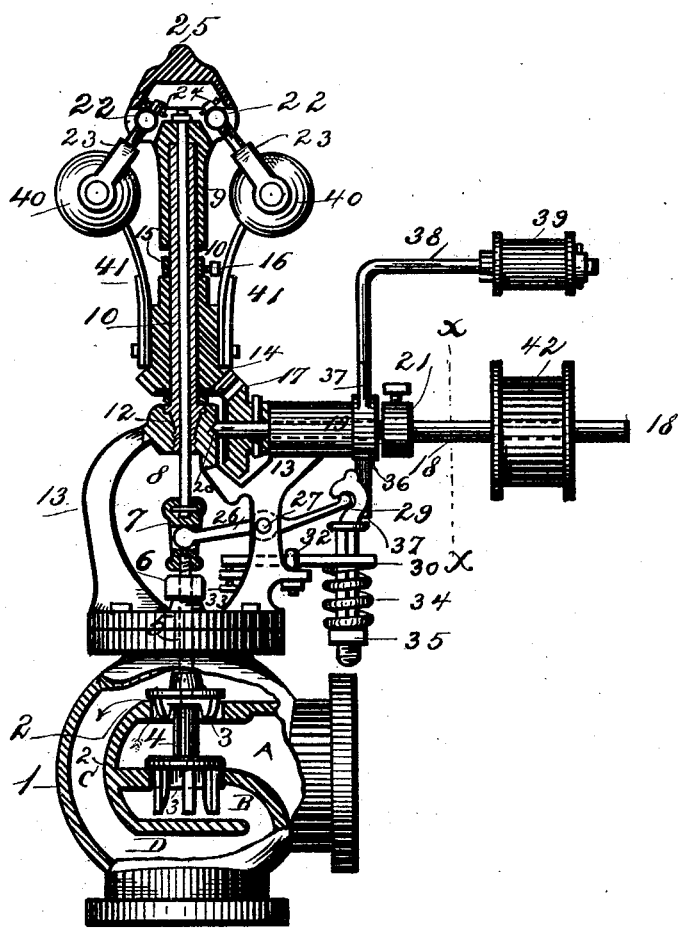

(No Model.)

F. W. SPACKE.
CENTRIFUGAL HIGH SPEED GOVERNOR.

No. 521,483.  Patented June 19, 1894.

WITNESSES:
Geo Loeper
H. G. Sturm

INVENTOR
Fred W. Spacke
BY
Jac C. W. Loeper
ATTORNEY.

UNITED STATES PATENT OFFICE.

FRED W. SPACKE, OF INDIANAPOLIS, INDIANA.

CENTRIFUGAL HIGH-SPEED GOVERNOR.

SPECIFICATION forming part of Letters Patent No. 521,483, dated June 19, 1894.

Application filed May 20, 1893. Serial No. 474,971. (No model.)

*To all whom it may concern:*

Be it known that I, FRED W. SPACKE, of Indianapolis, in the county of Marion and State of Indiana, have invented certain new and useful Improvements in Centrifugal High-Speed Governors; and I do hereby declare the following to be a full, clear, and exact description of the invention, such as will enable others skilled in the art to which it appertains to make and use the same.

My invention relates to certain new and novel improvements for steam engines, and the purpose is to provide means whereby prompt and absolute action of the operative parts can be obtained to control the differences in speed and whereby the steam may be shut off at once from the engine when the belt becomes disengaged from its pulley to the engine.

For a more thorough understanding of the construction and arrangements of the various parts and combinations thereof, reference is had to the accompanying drawings wherein like letters and numerals of reference indicate identical parts of my invention in the several figures in the drawings.

Figure 2:
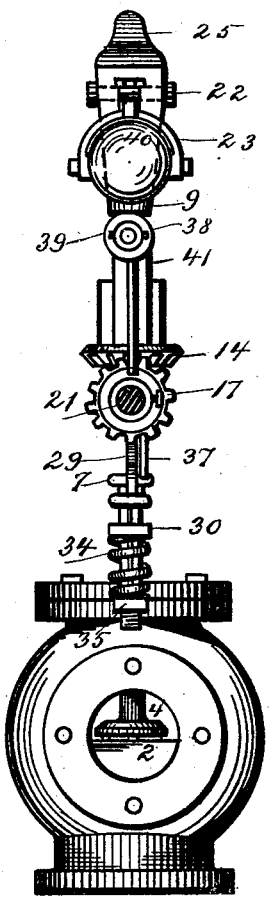

Figure 1, in the drawings represents a front elevation of my governor, partly in vertical section. Fig. 2, in the drawings represent a side elevation of the same, a certain part thereof is shown on the sectional line of Fig. 1 on line $x, x$.

In Fig. 1, 1 is the valve body provided with steam partitions and valve seats 2, 2, and steam ports 3, 3, permitting of the passage of the steam as indicated by the arrows on the drawings.

4, 4 is a double balanced valve into which is screwed or otherwise secured the valve rod 5 passing through top flange of valve and stuffing box 6 and is screwed into the valve rod coupling 7.

8, is a valve rod which passes through hollow spindle 10, its upper end being tightly screwed into the governor head 9, its under end fitting loosely into the valve rod connecting coupling 7, revolves freely therein and is held in proper position by stay pins or otherwise. Hollow spindle 10, screws at 12 into the center of supports 13.

14 is a beveled pinion loosely mounted on spindle 10 bearing on its under side on the supports at 12.

15 is a collar slipped over spindle 10 onto bevel pinion 14 and held in proper position by set screw 16 allowing bevel pinion 14 to revolve in connection with the governor head and balls 40 with springs 41 attached to the hub of pinion 14 and the upper ends into balls 40 allowing said bevel pinions 14 in connection with the balls and the governor head to freely revolve around the spindle or standard 10.

17, is a bevel pinion rigidly mounted on transverse pulley shaft 18, receiving motion from a driving pulley of an engine imparting said motion to pinion 14. Shaft 18, is journaled into the transverse supporting arm 19 of support 13 and held in proper position by means of center pivot 20 and a set screw collar 21. 22, transverse shafts journaled into the governor head 9. The supporting arms 23 of balls 40 pass through suitable openings in said shaft permitting said head 9 to raise upward or downward, and balls 40 to radiate to and from the vertical axis of the governor when the centrifugal action is increased or diminished. Through the upper ends of arms 23 stay pins 24 are provided to prevent said arms from dropping out of the transverse shafts 22.

25 is a cap fitting over the governor head 9, to prevent dust entering into the working parts of the governor head.

26 is a lever passing through the upright support 13 and is held in position by means of bolt 27, the left arm of which passes into an oblong opening of coupling 7, the right arm of which engages on its end with the trip hook 29.

30 is a lever extending outward from supporting arm 13 held in position thereon by clip 32 and made adjustable by set screw 33, on its right extreme end an oblong opening is provided to allow the passage of the downward projecting shank of trip 29.

34 is a compression coil spring which presses on its upper end against lever 30, its under end resting against tension nut 35.

36 is a collar loosely mounted on shaft 18 between transverse supporting arm 19 and set screw collar 21. Trip finger 37 is attached to collar 36 to strike against trip hook 29.

38 is a bell crank or arm rigidly attached to collar 36 on the vertical end. On the end of the other horizontal part is provided an idler 39 which rests on the belt when the governor is open and in operation.

Particular attention is called to steam chamber A its purpose being to equally divide the pressure of the steam onto the double valve 4 and pass said steam equally through the openings of valve seats 2, 2, through partitions C and B into the outlet D thus producing instant action on the valve.

As can be readily seen the operation of my governor is as follows: The valve rod 8 journaled into coupling 7 having been moved upward by lever 26 through trip 29 by means of nut 35 having been screwed upward admitting the necessary steam through the steam ports to the engine. In operation the pulley 42 transmits revolving motion by means of shaft 18, bevel pinions 14 and 17 to the head 9 and balls 40. As the speed increases or decreases the centrifugal power of the balls 40 regulates the speed of the engine in a manner well known. Should the belt connecting the engine with the governor break or otherwise disengage the bell crank will drop in a radiate-motion, the trip fingers 37 strike and disengage the trip head 29 from the lever 26 and being thus disengaged the governor head 9 and rods 8 and 5 connecting valve will drop downward and instantly close the steam ports.

Having thus described my invention, what I claim, and desire to secure by Letters Patent, is—

1. In a centrifugal steam governor the tubular spindle 10 screwed into the center of the supports 13, at 12. The valve rod 8, passing through said tubular spindle 10, revolving and supported on the lower end in valve coupling 7, on its upper end rigidly connected to the governor head 9, said head slipping over tubular spindle 10. The head 9 with horizontal shafts 22, the balls 40 with ball supports 23 sliding through said shafts 22. Spring 16 attached on the upper end to balls 40 on the lower end to bevel pinion 14. A suitable trip 29 and the lever 26 engaged with coupling 7 whereby valve 4 is instantly closed when lever 26 is released from trip 29 substantially as set forth.

2. In a centrifugal steam governor, the vertical valve rod 8, its coupling 7, rod 5 and valve 4 connected in a vertical alignment with said valve rod. The lever 26 pivoted intermediate between its ends and having one end engaging the coupling 7 and the opposite end engaging said trip hook 29. The trip hook supporting lever 30, its fulcrum 32, and adjusting screw 33, one end of lever 30 having an opening to receive the shank of said hook 29, the compression spring 34 and the adjusting nut 35, all substantially as described and for the purpose set forth.

In testimony whereof I have signed this specification in the presence of two subscribing witnesses.

FRED W. SPACKE.

Witnesses:
JACOB W. LOEPER,
J. C. WILSON.